United States Patent [19]
Pourtalet-McSweeny et al.

[11] Patent Number: 5,976,464
[45] Date of Patent: Nov. 2, 1999

[54] INSTALLATION FOR MONITORING AN ATMOSPHERE GENERATION APPARATUS

[75] Inventors: Pascale Pourtalet-McSweeny, Les Loges en Josas; Philippe Poynot, Gif sur Yvette, both of France

[73] Assignee: L'Air Liquide, Societe Anonyme pour l'Etude et l'Exploitation des Procedes Georges Claude, Paris, France

[21] Appl. No.: 09/041,296

[22] Filed: Mar. 12, 1998

[30] Foreign Application Priority Data

Mar. 13, 1997 [FR] France .................................. 97 03008

[51] Int. Cl.⁶ .................................................... G01B 7/00
[52] U.S. Cl. ................................ 422/62; 422/67; 422/81; 422/105; 422/108; 436/50; 436/55; 702/182; 702/183
[58] Field of Search ............................... 422/62, 67, 105, 422/81, 108, 117, 119; 436/50, 55; 702/179–185

[56] References Cited

U.S. PATENT DOCUMENTS

| | | | |
|---|---|---|---|
| 4,422,073 | 12/1983 | Winner ............................... | 340/870.21 |
| 5,341,980 | 8/1994 | Nishikawa et al. . | |
| 5,348,980 | 9/1994 | Garg et al. . | |
| 5,362,031 | 11/1994 | Heilmann et al. ......................... | 266/89 |
| 5,454,918 | 10/1995 | Javadi et al. ....................... | 204/153.19 |
| 5,531,218 | 7/1996 | Krebs ................................. | 128/203.12 |

FOREIGN PATENT DOCUMENTS

| | | |
|---|---|---|
| 0 457 431 A2 | 11/1991 | European Pat. Off. . |
| 0 457 431 A3 | 11/1991 | European Pat. Off. . |
| 0 482 992 A1 | 4/1992 | European Pat. Off. . |
| 0 732 303 A1 | 9/1996 | European Pat. Off. . |
| 2 595 800 | 9/1987 | France . |
| 32 39 627 | 5/1983 | Germany . |
| 41 21 277 A1 | 1/1993 | Germany . |
| 43 05 167 A1 | 8/1994 | Germany . |
| 2 288 254 | 10/1995 | United Kingdom . |

*Primary Examiner*—Long V. Le
*Attorney, Agent, or Firm*—Burns, Doane, Swecker & Mathis, L.L.P.

[57] ABSTRACT

An installation for monitoring an apparatus for generating atmospheres. The installation includes a measuring device for measuring at least one parameter representing the actual operation of the apparatus, an evaluator for evaluating the drift of each representative parameter over time and a trigger for triggering an intervention on the apparatus as a function of the drift before values of each representative parameter reach predetermined critical values.

11 Claims, 1 Drawing Sheet

INSTALLATION FOR MONITORING AN ATMOSPHERE GENERATION APPARATUS

FIELD OF THE INVENTION

The present invention relates to an installation for monitoring an atmosphere generation apparatus.

BACKGROUND OF THE DISCLOSURE

Apparatus for generating atmospheres are known, in particular atmospheres for heat-treating metals, and in particular atmospheres referred to as "protective". The treatments in question are, in particular, annealing, tensuring, pre-quench heating, decarburizing, brazing or sintering. An atmosphere of this type comprises predominantly nitrogen and controlled levels of reducing or carburizing, and oxidizing or decarburizing species.

These atmospheres are generally produced by a reactor which incompletely combusts a hydrocarbon, for example natural gas, with a nitrogen-rich oxidant gas, for example air or alternatively impure nitrogen having some residual oxygen level (most often in excess of 0.5%).

A method of obtaining a heat-treatment atmosphere employing a catalytic reaction of this type is described, for example, in EP-B-0,482,992.

Apparatus for generating atmospheres traditionally include control loops which employ means for measuring at least one parameter representing the actual operation of the apparatus. These means are connected to means for processing the values measured. They are formed by controllers which, for example, act on the temperature of the reactor or the inlet flow rates of the combustible and oxidant gases.

Apparatus equipped with control loops of this type operate properly in steady state. However, the control loops do not make it possible to guarantee the quality of the atmosphere produced in the event of serious drifts in certain parameters. In particular, the control loops cannot provide sufficient correction to remedy the premature aging of the catalytic mass contained in the reactor, or other components of the apparatus.

Thus, the user may not observe the degradation of certain elements of the apparatus until late, even though the quality of the atmosphere which is produced has already become unsatisfactory.

The means currently employed for atmosphere generation apparatus do not make it possible to predict future failures. Thus, there is an inability of control loops to compensate for these failures. Consequently, the progressive deterioration of the apparatus inevitably leads to its being stopped when it produces an atmosphere whose quality does not meet specifications. This shutdown frequently causes significant production losses in the downstream device which uses the atmosphere.

Further, before becoming able to observe the degradation in the quality of the atmosphere which is produced, the user device located downstream will continue to fabricate or treat products which need to be destroyed since they do not satisfy the requisite quality criteria.

The use of such atmosphere generation apparatus thus leads to significant extra costs when they age.

Further, the complexity of the atmosphere generation methods employed in these apparatus makes it very difficult to implement an efficient program for preventive maintenance. Indeed, calculation of the lifetime of the various constituents involves a high degree of complexity.

Users currently resort to changing the constituents of the generation apparatus frequently, even though they quite often do not require such replacement. This approach consequently entails high costs for operating this type of apparatus.

SUMMARY OF THE DISCLOSURE

The object of the invention is to contribute a solution to the above-mentioned problems by providing a monitoring installation which makes it possible to avoid unplanned shutdowns of the atmosphere generation apparatus and expensive preventive maintenance.

To this end, the invention relates to an installation for monitoring an atmosphere generation apparatus, which is of the aforementioned type and is characterized in that the processing means include:

means for restoring the values taken over time of each representative parameter, means for evaluating the drift of each representative parameter over time, and means for triggering an intervention on the apparatus as a function of the drift, before values of each representative parameter reach predetermined critical values.

According to particular embodiments, the installation may include one or more of the following characteristics:

triggering means which include means for assessing drift on the basis of predefined assessment criteria, and means for determining the nature of the intervention according to the result of the assessment;

processing means are provided at a distance from the apparatus and are connected to the measuring means by telecommunication means;

measuring means include means which for measuring the level of at least one gas constituent in the atmosphere produced at the outlet of the apparatus;

apparatus for generating an atmosphere comprising predominantly nitrogen and reducing or carburizing, and oxidizing or decarburizing species, employing a catalytic reaction of a mixture of hydrocarbons and impure nitrogen having a residual oxygen level, preferably greater than 0.5%, and in that the gas constituents whose level is measured comprise at least one gas constituent from carbon dioxide, water and methane;

the atmosphere generation apparatus includes a reactor in which a catalytic reaction takes place, and the measuring means include means for measuring the pressure in the reactor, the pressure constituting a parameter representing the actual operation of the apparatus;

the atmosphere generation apparatus is connected downstream to a device which uses the atmosphere which is produced, and the installation further-more includes, connected to the processing means, means for measuring at least one parameter representing the actual operation of the user device;

the atmosphere generation apparatus is connected upstream to a device for producing the gases used by the atmosphere generation apparatus [lacuna] the installation includes, connected to the processing means, means for measuring at least one parameter representing the actual operation of said production device.

The invention will be understood more clearly on reading the following description, given that solely by way of example and made with reference to the single appended figure.

DETAILED DESCRIPTION OF PREFERRED EMBODIMENTS

Figure 1:
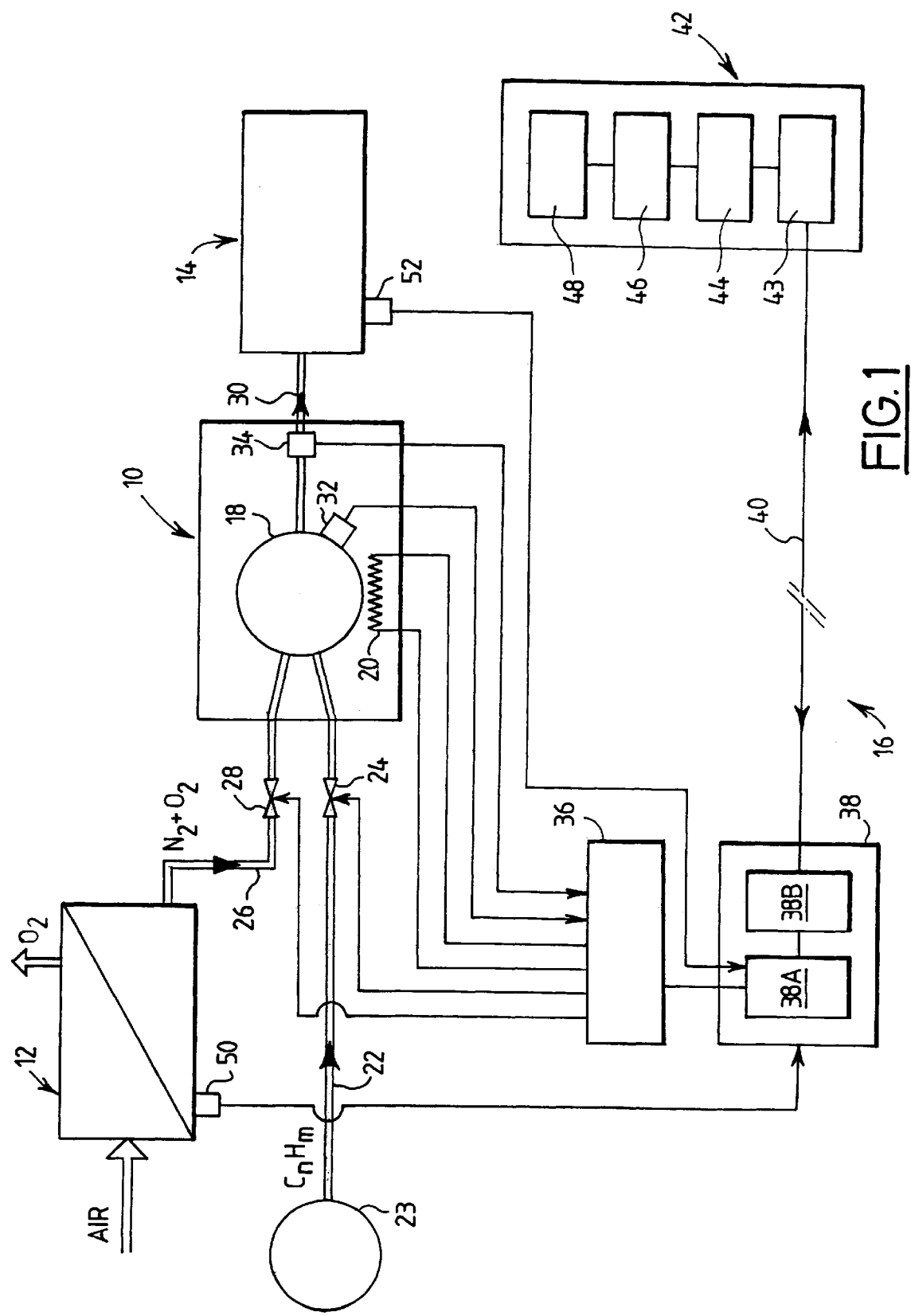
FIG. 1 is a schematic view of an installation employing an atmosphere generation apparatus associated with a monitoring installation according to the invention.

The installation represented in FIG. 1 essentially includes an atmosphere generation apparatus 10, upstream of which a gas production device 12 is provided, which includes a device for separating air by permeation, and, downstream, a device 14 using the atmosphere which is produced. The downstream device 14 may be for example, here a furnace for heat-treating metal parts.

Further, a monitoring installation 16 is associated with the atmosphere generation apparatus.

The atmosphere generation apparatus 10 is designed for implementing a method for catalytically forming an atmosphere for heat-treating metals, for example, such as the one described in EP-B-0,482,992.

Thus, the apparatus 10 includes a reactor 18 in which a catalyst based on precious metal, typically platinum or palladium, is contained on an alumina support. Reactor 18 is equipped with heating means 20, for example electrical resistors designed to produce a temperature of between 400° C. and 900° C. inside the reactor.

It will be understood that the example given here in conjunction with document EP-B-0,482,992 is no more than an illustration of the many possible ways of implementing the invention, and that other types of atmosphere generators can be used, without at any time departing from the scope of the present invention, for example, generators using a different type of catalytic reactor, or alternatively using a different reaction temperature range.

By way of illustration, it would also be possible, without departing from the scope of the present invention, to envisage the use of catalysts based on a non-noble metal such as nickel, and also to choose a higher reaction temperature range than the one mentioned above, for example extending from 900 to 1200° C.

For the embodiment which is represented, the reactor 18 is fed via a first feed pipe 22 with combustible gas, for example, natural gas, delivered from a store 23. This pipe includes a control valve 24 designed to regulate the flow rate of combustible gas supplied to the reactor 18.

The reactor 18 is also fed via a feed pipe 26 with impure nitrogen. This pipe is also equipped with a control valve 28 designed to regulate the flow rate of impure nitrogen supplied to the reactor 18.

The pipe 26 is connected to an impure-nitrogen outlet of the device 12 for separating air by permeation. This device is fed with air taken from the atmosphere. As is known per se, a membrane separates the oxygen and the nitrogen in air, to produce a first gas mixture, rich in nitrogen, which is often referred to as impure nitrogen (the "non-permeate" side) and a second gas mixture, rich in oxygen ("permeate" side). The two mixtures are then removed through separate outlets of the device. The gas flowing in the pipe 26 is formed essentially by nitrogen with a residual level of oxygen gas, preferably in excess of 0.5% and typically between 3 and 7%.

The outlet of the reactor 18 is connected to the furnace 14 via a pipe 30. The atmosphere flowing in this pipe 30 is generated by the catalytic reaction between the oxygen contained in the impure nitrogen and the hydrocarbon. For the embodiment which is illustrated, this reaction leads predominantly to the formation of the reducing species needed for protecting the metal, namely hydrogen and carbon monoxide. Water vapor, carbon dioxide and methane are also formed, but in a smaller quantity.

According to the invention, the installation 16 for monitoring the atmosphere generation apparatus includes means for measuring at least one parameter representing the operation of the apparatus. These means are formed by sensors installed on the apparatus.

In the example which is represented, the measuring means include a pressure sensor 32 installed directly on the reactor 18, or alternatively upstream of the reactor, for example on the pipe 26. They further include a set of sensors 34 installed on the pipe 30, designed to determine the level of a certain number of gas constituents in the atmosphere which is produced. In particular, these gas constituents whose level is measured may be one or more of the gas constituents, among carbon dioxide, water and methane.

In the monitoring installation 16, the sensors 32 and 34 are connected to a means for processing the values taken by the or each parameter representing the actual operation of the apparatus. These processing means include means 36 for controlling the operation of the apparatus 10. These means 36 are, for example, formed by a programmable automation unit.

The means 36 are connected via command lines to the control valves 24 and 28, as well as to the means 20 for heating the reactor.

Further, the processing means include communication means 38 connected to the control means 36. The communication means 38 include means 38A for storing the values which are taken over time and are detected by the sensors 32 and 34. One value detected by each sensor is, for example, stored at a regular time interval, for example every five seconds. These communication means 38 also include an interface 38B for coupling to a telecommunication network 40, in particular the telephone network.

The communication means 38 are, for example, formed by a microcomputer of the PC type, associated with a modem. They are connected to a means 42 for remotely tracking the values representing the actual operation of the apparatus 10.

These tracking means 42 are installed at a distance from the apparatus 10, and may even be located on a different site. They include an interface 43 for coupling to the network, and means 44 for storing the values taken over time by the parameters representing the operation of the apparatus.

The remote tracking means 42 also include means 46 for evaluating the drift of one or more of the stored representative parameters. They also include means 48 for triggering an intervention on the apparatus 10 as a function of the drift evaluated by the means 46, before the values of each representative parameter reach a predetermined critical value.

The remote tracking means 42 are, for example, formed by a microcomputer of the PC type, connected by a modem to the telecommunication network 40. A program which stores the values received from the communication means 38 is loaded in this microcomputer. To this end, the program transfers information between the means 38 and 43 at predefined instants. The program also evaluates the drift of the stored representative parameters and triggers an intervention of the apparatus if the result of the evaluation of the drift justifies it.

In particular, the triggering means employed by the program loaded in the microcomputer include means for assessing the drift on the basis of predefined assessment criteria, and means for determining the nature of the necessary intervention as a function of the result of the assessment.

By way of example, a curve showing the change in the pressure detected in the reactor 18 (or alternatively at the inlet of the reactor) by the sensor 32 as a function of time may be acquired and plotted. This curve is formed on the basis of the values stored for the pressure over time in the storage means 44. It is established by the pressure evaluation means 46.

Since the temperature in the reactor can vary over time, the detected pressure curve can be normalized by calculation to the theoretical pressure in the reactor for a given constant temperature.

To this end, a temperature probe is installed on the reactor 18, and the measured temperature values are stored with the pressure values at each instant. They are also transmitted to the remote tracking means 42.

It is also possible to consider a critical pressure, which may be denoted Pc expressing a pressure above which the catalyst contained in the reactor 18 needs to be regenerated or replaced.

The following phenomenon is then generally observed: during a first period of time, the pressure is substantially constant. In the following period of time, the pressure detected in the reactor increases substantially linearly.

This drift in the pressure during the second period is evaluated by the assessment means, for example, by calculating the director coefficient of the straight line representing the change in the pressure. It will then be understood that the progressive increase in the pressure will lead to the pressure in the reactor 18 exceeding the critical pressure $P_c$ after a certain time.

The means for determining the nature of the intervention which needs to be implemented compare the director coefficient calculated by the evaluation means with reference values in order to determine the nature of the intervention which needs to be carried out on the apparatus.

For example, if the director coefficient is greater than a first predetermined reference value, it will cause an operator to be sent to the site in order to replace the catalyst.

If the director coefficient is greater than a second predetermined reference value, less than the first reference value, the determination means will cause the reactor to be regenerated by circulating a purge gas through it, for example cryogenically produced nitrogen.

It will be understood that, with tracking of this type, it is possible to intervene on the apparatus before its performance is degraded and the quality of the atmosphere which is produced is insufficient to meet the needs of the consumer device 14.

It will be understood that the evaluation and triggering means may carry out similar analyses on other parameters, such as the levels of carbon dioxide, water and/or methane in the atmosphere which is produced.

In particular, the triggering means may assess the drift in the levels of carbon dioxide and water. If the level of these two gas constituents increases, the triggering means will, for example, deduce from this that the efficiency of the catalyst is falling. They will then determine the nature of the intervention which needs to be implemented.

If the level of methane in the reactor is tending to increase, the triggering means may cause the temperature in the reactor to increase. This is because a high methane level is detrimental since it promotes the formation of soot in the reactor.

It is possible for the temperature in the reactor to be increased automatically from the remote tracking means, for example by sending a target temperature through the communication network 40, this target being applied to the control 36 through the communication means 38.

Further, tracking the drifts over time of one or more parameters of the apparatus may also lead the triggering means to make a change to the targets or the flow rates of combustible and/or oxidant gases introduced into the reactor 18.

Further, a sensor 50 is provided on the air separation device 12 in order to determine the level of oxygen in the impure nitrogen which is produced. The sensor 50 is connected to the communication means 38 in order to make it possible to track this level using the remote tracking means 42.

Similarly, a set of sensors 52 may be installed on the furnace 14 in order to measure certain parameters representing its operation, for example the temperature in certain regions of it, or the level of hydrogen, carbon dioxide, water, carbon monoxide or methane in the atmosphere. This set of sensors may also make it possible to measure the pressure inside the furnace.

Similarly, this set of sensors is connected to the communication means 38 in order to make it possible to track the change in these various representative parameters using the remote tracking means 42.

It will be understood that an embodiment of this type, where the same monitoring installation (preferably remote monitoring) can be used to track the parameters representing both the operation of the actual atmosphere generation apparatus and devices located upstream of the apparatus (for example devices for producing gases used by apparatus), or alternatively devices located downstream of the atmosphere generation apparatus (for example devices which use the atmosphere produced by the apparatus) makes it possible very advantageously to correlate the values of the parameters detected over time on the various entities in order to make it possible to detect and quickly comprehend drifts that may be detrimental to the operation of the installation as a whole, and not only a very localized portion of this installation.

Although the description given above in conjunction with the figure related quite particularly to exemplifying the case of a source of impure nitrogen containing residual oxygen, it could be recalled here that the monitoring installation according to the invention which is described here applies much more broadly to other atmosphere generation apparatus, for example to apparatus employing an incomplete combustion reaction based on a hydrocarbon and air.

Similarly, the device which uses the atmosphere produced by the apparatus may be involved in a wide variety of fields, and for example in the field of soldering or brazing, or still by way of example, for the fabrication of electronic circuits or components.

We claim:

1. An installation for monitoring an apparatus for generating atmospheres comprising a measuring device for measuring at least one parameter representing the actual operation of the apparatus, said device connected to a processor for processing the values of each measured parameter, wherein said processor includes a restoring device for restoring the values taken over time of each representative parameter, an evaluator for evaluating the drift of each representative parameter over time, and means for triggering an intervention on said apparatus as a function of said drift, before said values of each representative parameter reach predetermined critical values.

2. The installation according to claim 1, wherein said trigger includes a device for assessing said drift on the basis of predefined assessment criteria, and a device for determining the nature of the intervention according to the result of said assessment.

3. The installation according to claim 1, wherein said processor is provided at a distance from said apparatus and is connected to said measuring device by telecommunication.

4. The installation according to claim 1, wherein said measuring device includes a device for measuring the level of at least one gas in the atmosphere produced at the outlet of the apparatus.

5. The installation according to claim 3, wherein said apparatus is an apparatus for generating an atmosphere comprising predominantly nitrogen and reducing or carburizing, and oxidizing or decarburizing species, employing a catalytic reaction of a mixture of hydrocarbon and impure nitrogen having a residual oxygen level, and in that the gas whose level is measured comprises at least one of carbon monoxide, hydrogen, carbon dioxide, water or methane.

6. The installation according to claim 4, wherein said apparatus generates an atmosphere comprising predominantly nitrogen and reducing or carburizing, and oxidizing or decarburizing species, employing a catalytic reaction of a mixture of hydrocarbon and air, and in that the gas whose level is measured comprises at least one of carbon monoxide, hydrogen, carbon dioxide, water or methane.

7. The installation according to claim 4, wherein said apparatus generates an atmosphere comprising predominantly nitrogen, $CO_2$ and water vapor, employing a catalytic reaction of a mixture of hydrocarbon and air, and in that the gas whose level is measured comprises at least one of carbon dioxide, water or methane.

8. The installation according to claim 4, wherein said apparatus generates an atmosphere comprising predominantly nitrogen, $CO_2$ and water vapor, employing a catalytic reaction of a mixture of hydrocarbon and air, and in that the gas whose level is measured comprises at least one of carbon dioxide, water or methane.

9. The installation according to claim 1, wherein said atmosphere generation apparatus includes a reactor in which a catalytic reaction takes place, and in that said measuring device includes a device for measuring the pressure in said reactor or upstream of said reactor, the pressure constituting a parameter representing the actual operation of the apparatus.

10. The installation according to claim 1, wherein said atmosphere generation apparatus is connected downstream to a device which uses said atmosphere, and connected to a measuring device which measures at least one parameter representing the actual operation of said user device.

11. The installation according to claim 1, wherein said atmosphere generation apparatus is connected upstream to a device for producing the gases used by said atmosphere generation apparatus in order to produce said atmosphere, and connected to said process or a measuring device which measures at least one parameter representing the actual operation of said production device.

* * * * *